Patented Sept. 30, 1952

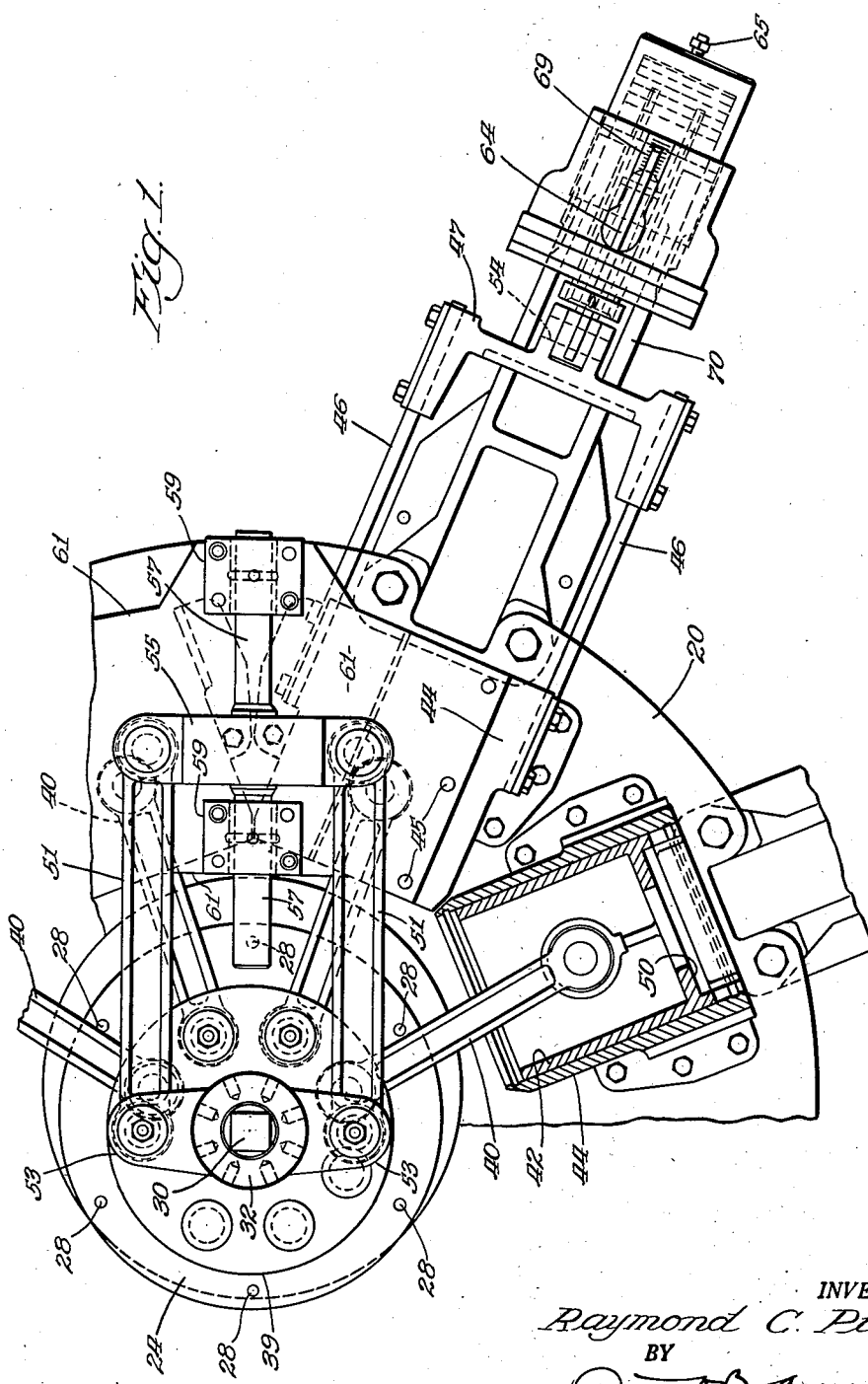

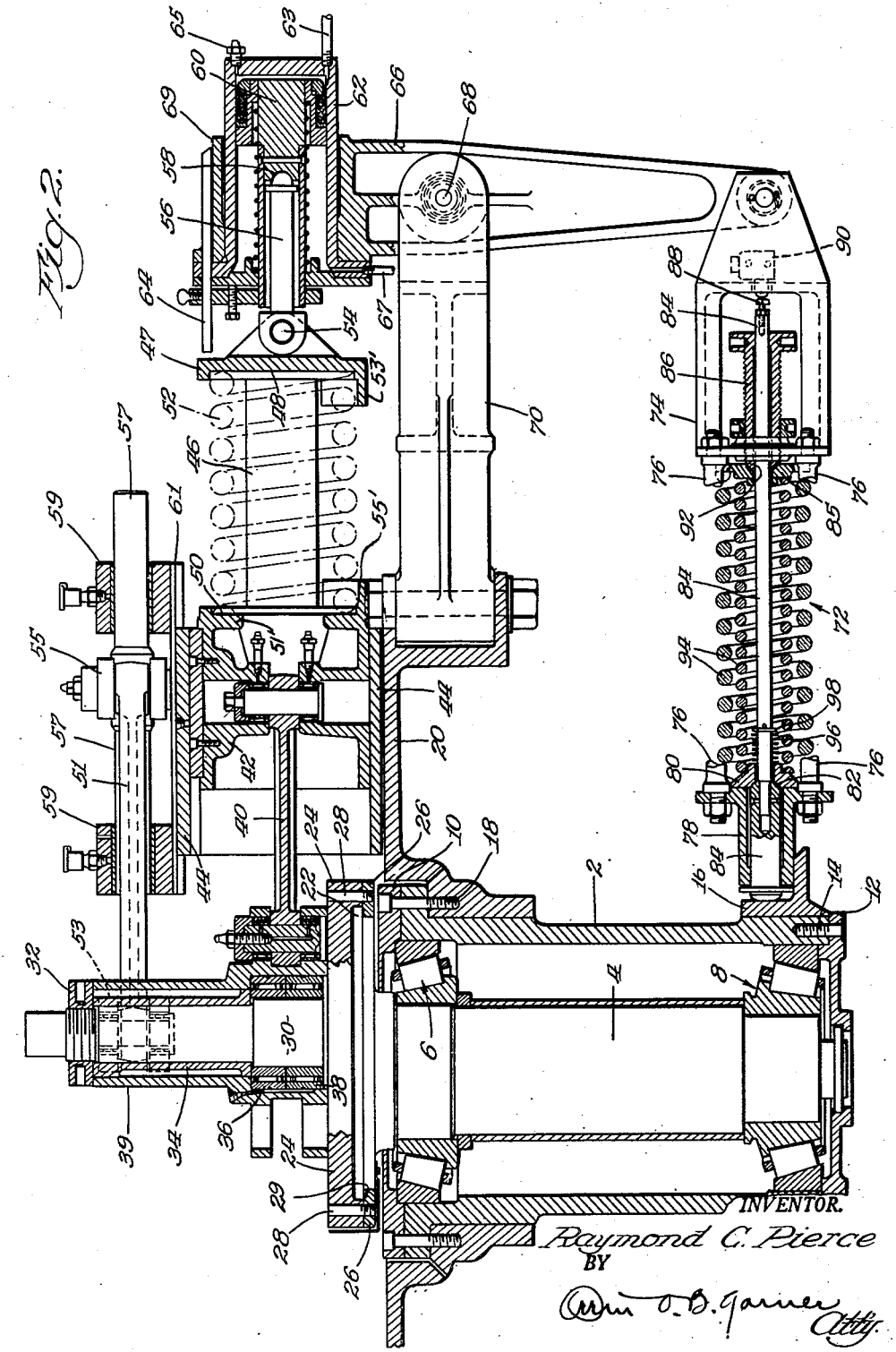

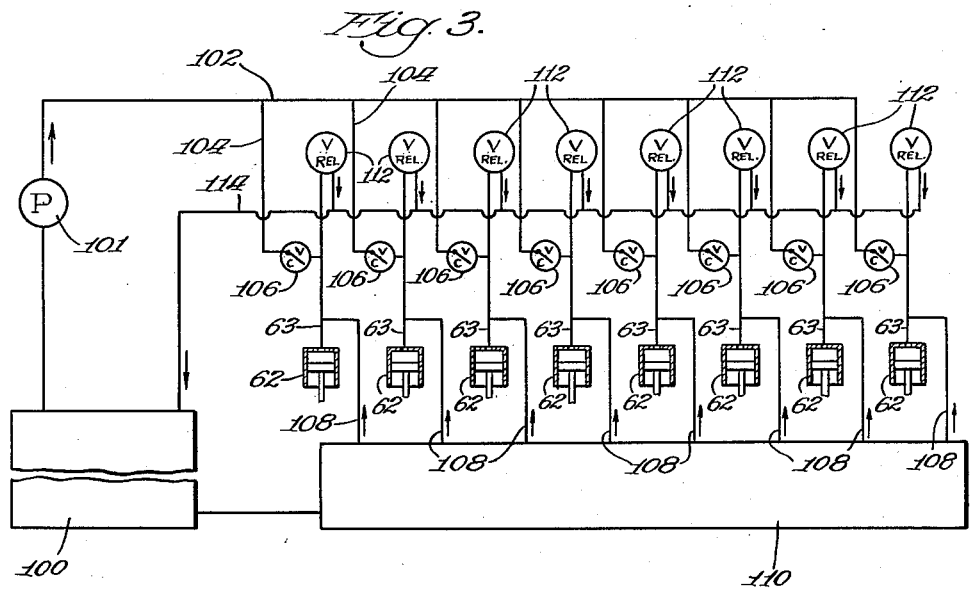
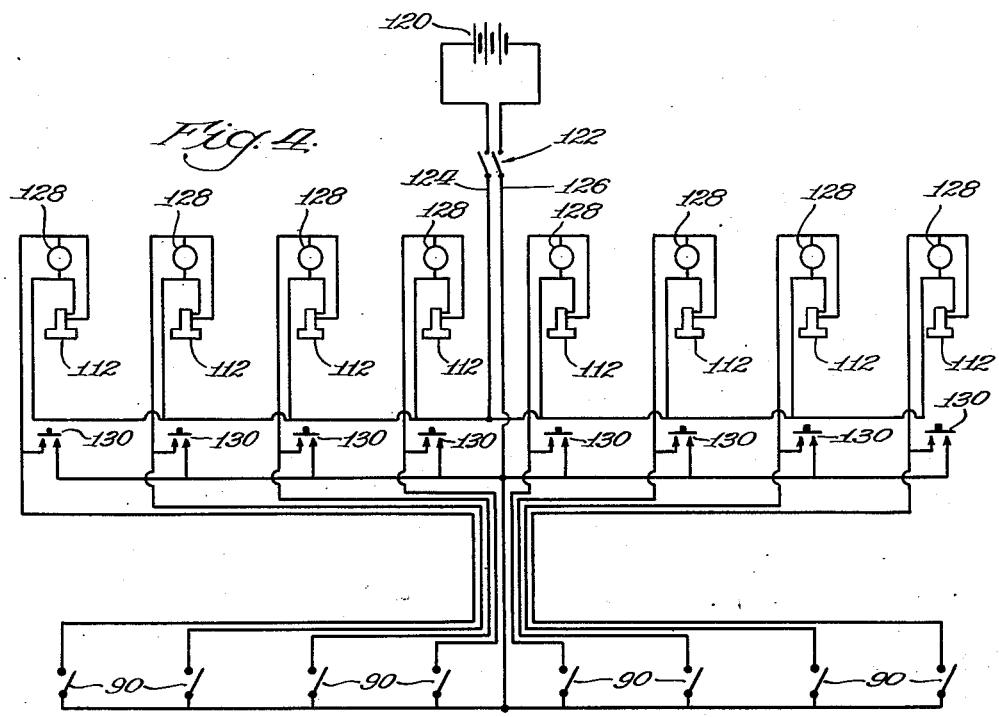

2,612,038

UNITED STATES PATENT OFFICE 2,612,038

SPRING TESTING MACHINE

Raymond C. Pierce, Chicago, Ill.

Application August 21, 1947, Serial No. 769,836

17 Claims. (Cl. 73—88)

This invention relates to spring fatigue testing equipment and more particularly to a novel device capable of testing a plurality of springs independently stressed.

A general object of the invention is to define a rugged testing machine capable of rapidly and accurately stressing and releasing the tested springs.

Another object of the invention is to independently stress a plurality of tested springs having the same or different capacities under identical loads to facilitate comparison of the performance of the various springs.

A different object of the invention is to test springs by subjecting the same to a predetermined load rather than a predetermined length of compression as in the prior art practices.

A more specific object of the invention is to provide novel means for accommodating variances in the conditions of a tested spring due to set thereof or thermal expansion thereof while maintaining a predetermined load or stress value at which the spring is stressed on each cycle of the device.

Another object of the invention is to provide novel means in a machine of the above-described type for stressing the springs by compressing the same between parallel seats thereby simplifying the stresses in the springs.

Still another object of the invention is to accommodate inspection and application of the tested springs by providing a radial mechanism in which the springs are arranged radially around a crank which is operatively connected to stressing devices associated with the springs.

A further object of the invention is to define a radial mechanism, such as above described, wherein parallel motion means are provided for positively affording uniform travel of the spring stressing devices.

The foregoing and other objects and advantages of the invention will become apparent from a consideration of the following specification and the accompanying drawings, wherein:

Figure 1 is a fragmentary top plan view of the novel machine with portions thereof broken away to clarify the illustration;

Figure 2 is a side view of the machine shown in Figure 1 with portions shown in vertical cross section;

Figure 3 is a piping diagram of the hydraulic system for actuating the outer spring supports to accommodate set in the tested springs; and Figure 4 is a wiring diagram of the electrical system for bleeding the hydraulic devices associated with the outer spring supports for the purpose of releasing said devices when the tested springs are subjected to predetermined test loads.

Describing the invention in detail and referring first to Figures 1 and 2, the novel machine comprises a frame including a cylindrical housing 2 containing the main operating shaft 4 of the machine, said shaft being supported by upper and lower roller bearing assemblies 6 and 8 retained by closure plates 10 and 12. The lower plate 12 is removably connected to the cylinder as by bolts 14 and preferably abuts the lower edge of a ring or collar 16 fitted over the cylinder and serving a purpose hereinafter described. The lower end of the shaft projects through a sealed opening in the plate 12 for connection to associated actuating means (not shown) such as, for example an electric motor or motor driven gear box adapted to rotate the shaft 4. The upper plate 10 is secured to the top of the cylinder 2 as by stud bolts 18 which also secure an annular frame or bed plate 20 which supports other parts of the machine as hereinafter described.

The upper end of the shaft 4 is provided with a circular disc 22 having a preferred eccentricity of approximately one and one-eighth inches with respect to the shaft 4, and the disc 22 is adjustably coupled to a crank disc 24 by a clamp plate 26 and stud bolts 28, the disc 22 being offset as at 29 to accommodate the annular clamp plate 26. The crank disc 24 is connected to a crank pin 30 which is preferably approximately one and one-eighth inches eccentric with respect thereto. Thus by rotational adjustment of the discs 22 and 24, any desired eccentricity from zero to two and one-quarter inches may be obtained between the shaft 4 and the crank pin 30. It will be understood that the dimensions stated are merely by way of illustration and may be varied as desired.

The crank pin 30 is threaded adjacent its upper end to accommodate a threaded retainer plate 32 which clamps annular bearing members 34, 36, and 38 against the disc 24 and secures a spider 39 which is slidably journaled on the crank pin. The spider 39 is pivotally connected to a plurality of radial connecting rods 40, each of which is pivotally connected to a cross head 42 reciprocal within a bearing 44 carried by the bed plate 20. It may be noted that in the illustrated embodiment of the machine, eight connecting rods 40 and associated cross heads 42 are contemplated; however, only two are shown in the drawings for the purpose of simplifying the illustration. It will be understood that any desired number of connecting rods and associated cross heads may be utilized.

Each bearing 44 supports a pair of guides 46 received within complementary recesses in a spring support or abutment member 47 to accommodate movement of the latter toward and away from the cross head 42, for a purpose hereinafter described. The spring abutment member 47 comprises a spring seat 48 substantially parallel to a spring seat 50 of the cross head 42, said seat 50 being formed on a spring abutment or support member 51' of the cross head. The abutment members 47 and 51' are preferably provided with ledges 53' and 55', respectively, to afford vertical support for a tested spring 52 interposed between the members 47 and 51' in abutment with their respective spring seats 48 and 50.

The spider 39 is guided by a parallel motion device comprising a pair of connecting rods 51 pivoted to jaws 53 on opposite sides of the spider 39, said rods being pivotally connected to a link 55 having a pair of stems or spindles 57 slidably journaled in bearings 59 supported by a bracket 61 (Figure 2) removably secured to a pair of the bearings 44 as at 45 (Figure 1). This device by restraining rotation of the spider 39 on the crank pin 30 positively affords true circular motion of the inner end of each connecting rod 40 to insure uniform stroke of the spring abutments or supports 50.

Thus it will be understood that each cross head 42 and associated spring support member 47 constitutes a pair of spring supports between which the tested spring 52 is alternately loaded and unloaded to secure a desired stress range as the cross head is reciprocated. As will be understood by those skilled in the art, the tested springs are generally under load throughout the stroke of the abutments 50, the minimum load being determined by the stroke of the abutments 50 and the maximum load being determined by the weighing devices hereinafter described.

It will be understood that, if desired, any suitable adjustable spring positioning means (not shown) may be mounted on the cross head 42 and support member 47 to accommodate springs of various diameters.

Each member 47 is pivoted at 54 to a stem 56 (Figure 2) having ball and socket connection at 58 with a piston 60 reciprocal within a cylinder 62. The cylinder is connected to an hydraulic line 63 adapted to convey hydraulic actuating fluid thereto, and the cylinder is provided with an air vent 65 and with a drain line 67 adapted to convey hydraulic fluid which may leak past the piston 60. The piston 60 preferably carries an adjustable pointer 64 readable on a scale 69 mounted on the top of the cylinder 62 to indicate travel of the piston thereby indicating changes in the condition of the tested spring 52 as, for example, set or expansion thereof. This feature is hereinafter more fully described in connection with the operation of the hydraulic cylinder and piston unit 60, 62.

The cylinder 62 is mounted on a lever 66 fulcrumed at 68 to a bracket 70 supported by the plate 20, the lower end of said lever being pivotally connected to a load or control spring mechanism or unit, generally designated 72, and serving a purpose hereinafter described in detail. The pivot point 68 of the lever 66 is preferably disposed to afford a two to one lever ratio so that the load spring mechanism 72 is subjected to only one-half the stress applied to the tested spring 52.

The load spring mechanism 72 comprises a frame 74 rigidly connected by rods 76 to a cylindrical supporting bearing 78, one end of which is normally engageable with an annular spring plate 80 having a ball and socket connection at 82 with a plunger 84 bearing against the collar 16 and extending through the plate 80. The plunger 84, adjacent its opposite end, extends through another annular spring plate 85 and through an adjustable sleeve 86 carried by the frame 74 in threaded engagement therewith. The extremity of the plunger 84 adjacent the lever 66 is provided with an adjustable movable contact 88 engageable with the normally spaced contact of a switch 90 mounted in the frame 74. The sleeve 86 and spring plate 85 are provided with complementary ball and socket means 92 to accommodate slight angularity therebetween, and one or more compression springs 94 are disposed between the plates 80 and 85 to resist compression of the mechanism 72. A spring 96 sleeved over the plunger 84 and bearing against a spring seat 98 carried thereby and against the spring plate 80 is adapted to maintain the plunger 84 and the spring seat 80 in snug engagement at 82 when the mechanism 72 is removed from the machine.

It may be noted that the mechanism 72 is a readily removable device which may be inserted in a static testing machine (not shown) and adjusted so that the switch 90 is actuated by compression of the mechanism 72 upon application thereto of a predetermined load. Closing of the switch 90, as hereinafter described, is adapted to bleed the cylinder 62 thereby reducing pressure on the tested spring 52 until the switch 90 is opened. It may also be noted that during operation of the novel testing device, the piston 60 and cylinder 62 device is movable in toto with the spring seat member 47, as the latter is loaded and unloaded by the tested spring 52, inasmuch as the device 60, 62 is movably mounted by means of the lever 66, which is connected to the load spring mechanism 72 for yieldingly resisting movement of the device 60, 62 under the load of the spring 52. Thus load on the tested spring 52 is not controlled by the hydraulic pressure within the cylinder 62.

Referring now to Figure 3, the hydraulic system for actuation of the cylinder and piston units 60 and 62 is diagrammatically illustrated. This system comprises a reservoir 100 of hydraulic fluid connected to a conventional pump 101, the discharge side of which is connected to a supply line 102 having branch lines 104, each of which is connected through a one-way check valve 106 to one of the cylinders 62 through the before-mentioned line 63 which is also connected to one of the independent outlet lines 108 of a conventional eight feed pump unit 110 comprising eight independent pumps connected to the respective lines 108. Each line 63 is also connected to a conventional solenoid actuated relief valve 112, the downstream side of which is connected to a line 114 communicating with the reservoir 100.

Figure 4 is a wiring diagram illustrating the electrical system connecting the switches 90 to the relief valves 112 for actuation of the latter. In Figure 4, a conventional voltage supply 120 is connected through a master switch 122 to a pair of leads 124 and 126, one of the leads being connected to the positive terminal of the supply 120 and the other lead being connected to the negative terminal thereof. When the master switch 122 is closed, in normal operation of the system, the closing of each switch 90 closes a circuit through the associated solenoid actuated relief valve 112 and through an indicator light 128 connecting in parallel therewith. A hand operated testing switch 130 is provided for each valve 112 to close a circuit therethrough independently of the associated switch 90 when it is desired to bleed the associated cylinder 62 or to test the valve 112.

The operation of the machine will next be described, particularly with reference to Figures 3 and 4 and the manner in which the cylinder and piston unit 60, 62 are actuated and bled. Assuming that it is desired to test each spring 52 at a maximum testing load of sixteen thousand pounds with the lever 66 at a ratio of two to one, each load spring mechanism 72 is calibrated in a static compression testing machine to actuate the switch 90 when the mechanism 72 is subjected to a load of eight thousand pounds. With the mechanisms 72 installed in the machine, the pump 101 is actuated to urge hydraulic fluid into the cylinders 62 until the pointers 64 indicate on the scales 69 that the pistons 60 are approximately in proper position so that the full maximum load of sixteen thousand pounds will be applied to the springs 52 upon actuation of the shaft 4.

At this point, the shaft 4 is actuated to drive the crank pin 30 with the pump 101 and the unit 110 in operation to urge hydraulic fluid into the cylinders 62. As each spring 52 is compressed to a value of sixteen thousand pounds, the associated switch 90 is actuated to open the associated relief valve 112 thereby bleeding the cylinder 62 and accommodating backing off of the spring support member 47 to prevent over-stressing of the spring 52. As soon as the switch 90 is released, the valve 112 is automatically closed to prevent further backing off of the spring support member 47. Under these conditions with the relatively high capacity pump 101 supplying the cylinders 62, the indicator lights 128 and valves 112 are actuated in sequence as the crank pin rotates in its circular path. At this time the pump 101 is stopped, and the pump unit 110 is continued in operation to supply hydraulic fluid at a very low rate of a few drops per minute to the cylinders 62. Thus the spring support members 47 are constantly advanced at a very slow rate; however, overloading of the springs is prevented by actuation of the switches 90 and the associated relief valves, thereby maintaining correct loading with great exactness and, at the same time, accommodating spring set as well as backing off at the seats 47, if necessary, to compensate for thermal expansion of the tested springs.

It may be noted that the load spring mechanism 72 determines the maximum load on the tested spring 52 independently of the hydraulic system associated with the device 60, 62, inasmuch as the weighing spring mechanism is calibrated to actuate the switch 90 at a predetermined load on the mechanism exerted by the lever 66. Thus the associated relief valve 112 is immediately opened to prevent further loading of the tested spring 52 until the switch 90 closes. Such an arrangement avoids fluctuation in the maximum stress load on the tested spring due to variations in the hydraulic system, such as changes in the frictional resistance to flow of hydraulic fluid or entrapment of air in the fluid.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A spring tester comprising a frame, opposed abutments carried by said frame for supporting a spring therebetween, means for reciprocating one of said abutments, a hydraulic piston and cylinder device connected to the other abutment, valve means for said cylinder, and means for maintaining a predetermined maximum compressive load on said spring comprising a spring control unit having one end fixed and its other end reacting on the end of said device, and means responsive on compression of said unit for automatically operating said valve until the compression of said unit is relieved.

2. A spring testing machine comprising a frame, a lever fulcrumed thereto and having relatively short and long arms at opposite sides of its fulcrum point, a spring seat carried by the short arm of said lever, means for moving said seat relative to said lever comprising an hydraulic piston and cylinder device operatively connected to the seat and the lever, a load spring mechanism connected to the long arm of said lever and to the frame, said mechanism containing a weighing spring adapted to yield in response to a predetermined force exerted by said lever, and a switch adapted to be actuated by said mechanism upon yielding of the weighing spring, a spring abutment mounted on said frame, means for reciprocating said abutment to load an associated spring between said seats and abutment, means for continuously supplying hydraulic fluid to said device at a pressure greater than that exerted thereagainst by said first-mentioned spring, and means responsive to closing of said switch for bleeding said fluid from said device.

3. A spring tester comprising a frame, opposed supports carried by the frame for supporting a spring therebetween, means for reciprocating one of said supports, a hydraulic piston and cylinder device connected to the other support, valve means for said cylinder, and means for maintaining a predetermined maximum test load on said spring comprising a spring control unit having one end fixed and having its other end reacting on the end of said device, and means responsive to deformation of said unit for automatically operating said valve until deformation of said unit is relieved.

4. A test machine of the class described comprising spaced supports adapted to engage an article to be tested, operating means connected to at least one of the supports for moving it toward and away from the other support to repeatedly stress said article, a load spring unit, a piston and cylinder device movable as a unit and comprising a cylinder member and a piston member therein, one of said members being connected to one of the supports, the other member being connected to the spring unit for stressing the latter as said article is stressed by said supports, means for continuously pumping hydraulic pressure fluid into said device during operation of said operating means to compensate for permanent deformation of said article, and means responsive to a predetermined magnitude of deformation of said load spring unit for bleeding said device until deformation of said load spring unit is less than said magnitude, whereby said article is stressed at a constant load predetermined by said load spring unit independently of hydraulic pressure value in said device.

5. A testing machine comprising spaced supports for loading an article to be tested, means for effecting relative reciprocal movement of the supports to alternately load and unload the article, a resilient unit, a power device operatively connected to the unit and to one support and movable in unison with the latter relative to the other support whereby load of the article on said one support is transmitted through said device to said unit, means independent of the first mentioned means for operating said device to move said one support relative to said other support to compensate for set in said article, and means responsive to deformation of a predetermined magnitude of said unit by said device for rendering said operating means ineffective only until said deformation is less than said magnitude.

6. A spring tester comprising a frame, opposed supports carried by the frame for supporting a spring therebetween, means for reciprocating one of the supports, a hydraulic piston and cylinder device connected to the other support, valve means for said cylinder, and means for maintaining a predetermined maximum test load on said spring comprising a control unit having one end reacting against the frame, said unit having its other end reacting against an end of the device, and means responsive to a predetermined load on said unit by said device for automatically operating said valve until said load on said unit is relieved.

7. A spring testing machine comprising a spring support, a load spring mechanism operatively connected thereto and comprising a switch device connected to the support and to the mechanism, said switch device being adapted to close upon imposition of a load of predetermined value on said mechanism and adapted to open when said load is less than said value, an abutment, means for reciprocating the abutment to load an associated spring between said support and said abutment, means for moving the support relative to the abutment for accommodating set of said spring, and means responsive to closing of said switch for automatically releasing said second-mentioned means until said switch is opened.

8. A spring tester comprising a machine including a pair of spring supports and means for effecting relative movement of the supports to stress an associated spring therebetween, a load spring, a piston and cylinder device including a cylinder member and a piston member therein, one of the members being connected to one support and the other being connected to said load spring for stressing the latter as the first-mentioned spring is stressed by relative movement of the supports, means for continuously pumping hydraulic pressure fluid into said device to stress said springs, and means responsive to stress of a predetermined maximum value on said load spring for bleeding said device until said stress on said load spring is reduced to a value less than said maximum value, said last-mentioned means being independent of the value of hydraulic pressure between said members.

9. A spring testing machine comprising a frame, a crank mechanism including a spider and a crank pin rotatably connected thereto, means for rotating said pin, a pluarlity of spring supports around said pin, a plurality of connecting rods pivotally connected to the spider, a plurality of spring supports pivotally connected to respective rods for reciprocation thereby, each of the second-mentioned supports being aligned with one of the first-mentioned supports to load an associated spring therebetween, and a parallel motion device connected to the frame and connected to the spider for preventing rotation thereof, thereby positively guiding the inner ends of the rods in circular paths to afford uniform travel of the first-mentioned supports.

10. A spring tester comprising spaced spring supports relatively movable in opposite directions to load an interposed coil spring therebetween during such movement in one direction and to unload said spring during such movement in the other direction, means operatively connected to at least one of the supports for effecting such relative movement thereof, a device independent of said means and connected to one of the supports for continuously effecting movement thereof relative to the other support in said one direction, means movably supporting said device for movement in toto and in unison with said one support as said spring is loaded and unloaded, means yieldingly resisting movement of said device under the load of said spring as it is loaded by said first mentioned means, and means responsive to stress of a predetermied magnitude of said yielding means under the load of said spring for automatically releasing said device until said stress is less than said predetermined magnitude.

11. A testing machine comprising a pair of supports, means operatively connected to at least one support for effecting relative reciprocal movement of the supports to alternately load and unload an article to be tested, a power device movable in toto and in unison with one support and operatively connected thereto for moving it relative to the other to compensate for set in the article, means independent of the first mentioned means for actuating said power device, resilient means deformable by said device as the article is loaded, and control means responsive to a predetermined magnitude of deformation of said resilient means for rendering said independent means ineffective until deformation of said resilient means is less than said magnitude.

12. A spring testing machine comprising a frame, a spider, a crank pin rotatably mounted therein, means for rotating said pin, a plurality of connecting rods extending radially from the pin and pivotally connected to the spider, a plurality of spring supports pivotally connected to respective rods, and a plurality of spring supports carried by the frame and aligned with respective of the first-mentioned supports, and a parallel motion device connected to the frame and to the spider for positively guiding the inner ends of the rods in substantially uniform circular paths.

13. A testing machine comprising a frame member, a lever member fulcrumed thereto, a pair of supports for an article to be tested, one of said supports being carried by the frame member and the other by one arm of the lever member, means for reciprocating said one support to stress an article to be tested between said supports, means for moving said other support relative to said lever member comprising a hydraulic piston and cylinder device operatively connected to said other support and said lever member, a load spring connected to the other arm of the lever member and to said frame member, said spring being adapted to yield in response to a predetermined force exerted by said lever member, a switch carried by one of said members, means operatively connected to the other of said members and to said switch for actuating the latter upon yielding of the load spring, means for continuously supplying hydraulic fluid to said device, and means responsive to actuation of said switch for bleeding said fluid from said device.

14. A testing machine comprising a loading mechanism including a pair of supports, means operatively connected to said mechanism for moving said supports in one direction relative to each other to load an interposed tested article and for moving said supports in the opposite direction relative to each other to unload said article, a fluid actuated power device movable in toto with one of said supports and operatively connected thereto for moving it in said one direction to compensate for permanent deformation in said article, means independent of the first mentioned means for supplying pressure fluid to said device, resilient means for resisting movement of said device in said opposite direction under the load of said article, and means responsive to a predetermined magnitude of deformation of said resilient means for bleeding said fluid from said device, said bleeding means being automatically ineffective whenever the deformation of said resilient means is less than said magnitude.

15. A spring testing machine comprising a frame, an actuating member, a crank pin rotatably connected thereto, means for rotating the pin about an axis eccentric with respect to the axis of said pin, a spring seat, a connecting rod pivotally connected to the seat and pivotally connected to a pivot on the member, a spring seat carried by the frame in alignment with the first-mentioned seat, and a parallel motion device connected to the frame and to the member for preventing rotation of the latter on the axis of said pin, thereby positively guiding the pivot in a predetermined uniform circular path.

16. A testing machine comprising a frame, a lever fulcrumed thereto, a support carried by one arm of the lever, means for moving said support relative to said lever comprising a hydraulic piston and cylinder device operatively connected to the support and the lever, a load spring mechanism connected to the other arm of said lever and to the frame, another support, means for reciprocating said other support to load a tested article disposed between said supports, means for continuously supplying hydraulic fluid to said device at a pressure greater than that exerted thereagainst by said article, and means responsive to yielding of said load spring mechanism for automatically bleeding said fluid from said device.

17. A spring testing machine comprising a frame, a lever fulcrumed thereto and having relatively short and long arms at opposite sides of its fulcrum point, a spring seat carried by the short arm of said lever, an abutment mounted on the frame, means for reciprocating said abutment to load an associated spring between said abutment and seat, means for moving the spring seat with respect to the abutment to accommodate set of said spring, and means connected to the last-mentioned means and to the long arm of said lever for automatically rendering the last-mentioned means ineffective upon imposition of a load of predetermined maximum value by said spring against the short arm of the lever.

RAYMOND C. PIERCE.

REFERENCES CITED

The following references are of record in the file of this patent:

UNITED STATES PATENTS

| Number | Name | Date |
| --- | --- | --- |
| 1,650,736 | Zelov | Nov. 29, 1927 |
| 2,088,372 | Gogan | July 27, 1937 |
| 2,381,241 | Wilcox | Aug. 7, 1945 |